(12) United States Patent
Haren

(10) Patent No.: US 6,886,058 B2
(45) Date of Patent: Apr. 26, 2005

(54) TRANSACTION PARTITIONING

(75) Inventor: Ken C. Haren, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/739,274

(22) Filed: Dec. 19, 2003

(65) Prior Publication Data

US 2004/0133714 A1 Jul. 8, 2004

Related U.S. Application Data

(63) Continuation of application No. 09/608,644, filed on Jun. 30, 2000, now Pat. No. 6,694,392.

(51) Int. Cl.[7] .............................................. G06F 13/14
(52) U.S. Cl. ......................... 710/65; 711/201; 712/204; 375/366; 375/368
(58) Field of Search ........................... 710/65; 711/201; 712/204; 375/366, 368

(56) References Cited

U.S. PATENT DOCUMENTS

| | | | |
|---|---|---|---|
| 5,189,671 A | * | 2/1993 | Cheng .......................... 370/471 |
| 5,517,631 A | * | 5/1996 | Machado et al. ............ 711/111 |
| 5,859,990 A | * | 1/1999 | Yarch ........................... 710/33 |
| 6,006,289 A | * | 12/1999 | James et al. .................. 710/35 |
| 6,016,394 A | | 1/2000 | Walker ......................... 395/701 |
| 6,042,545 A | | 3/2000 | Hossack et al. ............. 600/443 |
| 6,122,717 A | * | 9/2000 | Chan et al. ................... 711/170 |
| 6,370,636 B1 | | 4/2002 | Park ............................. 712/204 |
| 6,378,007 B1 | | 4/2002 | Southwell ..................... 710/1 |
| 6,393,549 B1 | | 5/2002 | Tran et al. ................... 712/204 |
| 6,512,852 B1 | | 1/2003 | Wu et al. ..................... 382/232 |
| 6,539,465 B1 | | 3/2003 | Chan et al. .................. 711/201 |
| 6,625,240 B1 | | 9/2003 | Miyahara ..................... 375/366 |
| 6,654,012 B1 | * | 11/2003 | Lauer et al. ................. 345/424 |

* cited by examiner

*Primary Examiner*—A. Elamin
(74) *Attorney, Agent, or Firm*—Kenyon & Kenyon (57) ABSTRACT

Data transactions are partitioned to transfer data across a communication connection requiring naturally aligned data transfers of quad-words. It is determining from byte enable signals whether the bytes of the data to be transferred start in the high order dword or end in the low order dword of a quad-word. The transaction is separated into two transactions if the bytes of the data to be transferred start in the high order dword or end in the low order dword of a quad word. A second transaction is created by pre-appending if the bytes of the data to be transferred start in the high order dword. A second transaction is created by post-appending if the bytes of the data to be transferred end in the low order dword of a quad word.

17 Claims, 9 Drawing Sheets

| | | | | | | | | | |
|---|---|---|---|---|---|---|---|---|---|
| CLOCK 3 | 17 | 16 | 15 | 14 | 13 | 12 | 11 | 10 | REGISTERED |
| | x | x | x | x | x | x | x | x | BYPASS |
| CLOCK 2 | F | E | D | C | B | A | 9 | 8 | REGISTERED |
| | 17 | 16 | 15 | 14 | 13 | 12 | 11 | 10 | BYPASS |
| CLOCK 1 | 7 | 6 | 5 | 4 | 3 | 2 | 1 | 0 | REGISTERED |
| | F | E | D | C | B | A | 9 | 8 | BYPASS |
| CLOCK 0 | x | x | x | x | x | x | x | x | REGISTERED |
| | 7 | 6 | 5 | 4 | 3 | 2 | 1 | 0 | BYPASS |
| BYTE LANE | 7 | 6 | 5 | 4 | 3 | 2 | 1 | 0 | |
| | 7 | 6 | 5 | 4 | 3 | 2 | 1 | 0 | FIFO LINE 0 |
| | F | E | D | C | B | A | 9 | 8 | FIFO LINE 1 |
| | 17 | 16 | 15 | 14 | 13 | 12 | 11 | 10 | FIFO LINE 2 |

FIG. 4A

| | | | | | | | | | |
|---|---|---|---|---|---|---|---|---|---|
| CLOCK 3 | 11 | 10 | 17 | 16 | 15 | 14 | 13 | 12 | REGISTERED |
| | x | x | x | x | x | x | x | x | BYPASS |
| CLOCK 2 | 9 | 8 | F | E | D | C | B | A | REGISTERED |
| | 11 | 10 | 17 | 16 | 15 | 14 | 13 | 12 | BYPASS |
| CLOCK 1 | 1 | 0 | 7 | 6 | 5 | 4 | 3 | 2 | REGISTERED |
| | 9 | 8 | F | E | D | C | B | A | BYPASS |
| CLOCK 0 | x | x | x | x | x | x | x | x | REGISTERED |
| | 1 | 0 | 7 | 6 | 5 | 4 | 3 | 2 | BYPASS |
| BYTE LANE | 7 | 6 | 5 | 4 | 3 | 2 | 1 | 0 | |
| | 7 | 6 | 5 | 4 | 3 | 2 | 1 | 0 | FIFO LINE 0 |
| | F | E | D | C | B | A | 9 | 8 | FIFO LINE 1 |
| | 17 | 16 | 15 | 14 | 13 | 12 | 11 | 10 | FIFO LINE 2 |

FIG. 4B

| | | | | | | | | | |
|---|---|---|---|---|---|---|---|---|---|
| CLOCK 3 | 12 | 11 | 10 | 17 | 16 | 15 | 14 | 13 | REGISTERED |
| | x | x | x | x | x | x | x | x | BYPASS |
| CLOCK 2 | A | 9 | 8 | F | E | D | C | B | REGISTERED |
| | 12 | 11 | 10 | 17 | 16 | 15 | 14 | 13 | BYPASS |
| CLOCK 1 | 2 | 1 | 0 | 7 | 6 | 5 | 4 | 3 | REGISTERED |
| | A | 9 | 8 | F | E | D | C | B | BYPASS |
| CLOCK 0 | x | x | x | x | x | x | x | x | REGISTERED |
| | 2 | 1 | 0 | 7 | 6 | 5 | 4 | 3 | BYPASS |
| BYTE LANE | 7 | 6 | 5 | 4 | 3 | 2 | 1 | 0 | |
| | 7 | 6 | 5 | 4 | 3 | 2 | 1 | 0 | FIFO LINE 0 |
| | F | E | D | C | B | A | 9 | 8 | FIFO LINE 1 |
| | 17 | 16 | 15 | 14 | 13 | 12 | 11 | 10 | FIFO LINE 2 |

|  |  |  | last enables | first enables | last enables | first enables |
|---|---|---|---|---|---|---|
|  |  |  | Transaction 2 || Transaction 1 ||
| qwords | quad-word 3 || quad-word 1 || quad-word 0 ||
| dwords | dword 5 | dword 4 | dword 3 | dword 2 | dword 1 | dword 0 |
| Bytes | | | | | | | | X | X | X | X | X | X | X | X | X | X | | | | |

FIG. 8

|  |  |  | last enables | first enables | last enables | first enables |
|---|---|---|---|---|---|---|
|  |  |  | Transaction 2 || Transaction 1 ||
| qwords | quad-word 3 || quad-word 1 || quad-word 0 ||
| dwords | dword 5 | dword 4 | dword 3 | dword 2 | dword 1 | dword 0 |
| Bytes | | | | | | | | | | X | X | X | X | X | X | X | X | X | X |

FIG. 9

|  | last enables | first enables | last enables | first enables | last enables | first enables |
|---|---|---|---|---|---|---|
|  | Transaction 3 || Transaction 2 || Transaction 1 ||
| qwords | quad-word 3 || quad-word 1 || quad-word 0 ||
| dwords | dword 5 | dword 4 | dword 3 | dword 2 | dword 1 | dword 0 |
| Bytes | X | X | X | X | X | X | X | X | X | X | X | X | X | X | X | X | X | X | | | | |

FIG. 10

|  |  |  | last enables |  |  | first enables |
|---|---|---|---|---|---|---|
|  | Transaction 1 ||||||
| qwords | quad-word 3 || quad-word 1 || quad-word 0 ||
| dwords | dword 5 | dword 4 | dword 3 | dword 2 | dword 1 | dword 0 |
| Bytes | | | | | | | | X | X | X | X | X | X | X | X | X | X | | | | |

FIG. 11

TRANSACTION PARTITIONING

RELATED APPLICATIONS

This is a continuation of U.S. patent application Ser. No. 09/608,644 filed Jun. 30, 2000, which is now U.S. Pat. No. 6,694,392.

BACKGROUND

1. Field of the Invention

This invention relates generally to the transfer of data between a communication channel and a host processing system. In particular, the present invention relates to methods for partitioning transactions transferring data from a communication channel to a host system.

2. Description of the Related Art

Many computer systems, such as workstations or personal computers (PCs) with a Pentium® class microprocessor processing device (manufactured by Intel® Corporation, of Santa Clara, Calif.), typically use Peripheral Component Interconnect (PCI) buses as an interconnect transport mechanism to transfer data between different components, such as one or more processors, memory subsystems and input/output (I/O) devices including, for example, keyboards, input mouses, disk controllers, serial and parallel ports to printers, scanners, and display devices. The PCI buses are high performance 32 or 64 bit synchronous buses with slots having automatic configurability and multiplexed address, control and data lines as described in the latest version of "*PCI Local Bus Specification, Revision 2.2*" set forth by the PCI Special Interest Group (SIG) on Dec. 18, 1998. Currently, PCI slots are the most common connection method used to extend computer systems for add-on arrangements (e.g., expansion cards) with new networking, video, or disk memory storage capabilities. Bridges may be provided to interface and buffer transfers of data to the PCI bus from other subsystems. An example of such a bridge is a PCI-PCI bridge as described in detail in the "*PCI-PCI Bridge Architecture Specification, Revision 1.1*" set forth by the PCI Special Interest Group (SIG) on Apr. 5, 1995.

The performance of the host processing system may be burdened by the demands of I/O devices to access processors and memory locations of the processing system during data transfer operations. This is especially true for PCI buses with multiple device slots since access to the PCI bus must be acquired before data can be transferred to or from any device connected to the bus. In some systems, such as a server, there may be a large amount of data storage and communications functionality and the demand for access to the system may be complex. For example, data transfers between a processing system and an external communications network are typically highly asynchronous and the bit size of the payload data on the communications channel may not be the same as the bit sizes for host processors, memory subsystems, I/O subsystems, etc. As a result data transfer transactions may not be optimized for external network data, and the wait time for processing data may be unnecessarily lengthened.

Some host processor interfaces and host buses require naturally aligned data. Furthermore, at the beginning of a message sequence, it may be required to know how much data is associated with the message. The amount of data must be specified for the specific naturally aligned granularity of the host processor interface and/or bus. In many cases, the hardware of the network interface does not operate at the same alignment and/or granularity as the host bus and it would be convenient to have a simple efficient mechanism for converting data length counts between naturally aligned granularities.

The host bus may have specific requirements so that data is presented to the processor in a format and in a manner designed for optimum processing speed and throughput. Such requirements necessitate data transactions with specific limitations, such as naturally aligned granularities, address alignment, data alignment, and data length. Thus, data transfers frequently have to be carried out through a number of different transactions. It is preferable that these transactions are partitioned in the most efficient way. There is a need for a method which automatically determines the most efficient partitioning of data transactions.

BRIEF DESCRIPTION OF THE DRAWINGS

A better understanding and appreciation of the foregoing and of the attendant advantages of the present invention will become apparent from the following detailed description of example embodiments of the invention. While the foregoing and following written and illustrated disclosure focuses on disclosing example embodiments of the invention, it should be clearly understood that the same is by way of illustration and example only and is not to be taken by way of limitation.

DETAILED DESCRIPTION

The devices described according to the invention may support a number of logical channels and/or a number of physical links. Each channel may be a bi-directional communication path allowing commands and data to flow between a processing system and the network. The data may be transmitted across the network in packet form, often in organized groups of packets according to various communication protocols and often through intermediate nodes. Each processing system connected to the network has a network interface which acts as the communications intermediary between the asynchronous network traffic and its own, usually synchronous, input/output (I/O) subsystems.

While example embodiments of the invention are described herein, the present invention is applicable for use with all types of computer networks, network interfaces, and chipsets, including follow-on chip designs which link together such disparate processing systems as computers, servers, peripherals, storage devices, and devices for data communications. Examples of such computer networks may include a local area network (LAN), a wide area network (WAN), a campus area network (CAN), a metropolitan area network (MAN), a global area network (GAN) and a system area network (SAN), including newly developed computer networks using Next Generation I/O (NGIO), Infiniband or other channel based, switched fabric architecture. LAN networks may include versions of Ethernet, Gigabit Ethernet, FDDI (Fiber Distributed Data Interface), Token Ring, Asynchronous Transfer Mode (ATM), Fibre Channel and Wireless. However, for the sake of simplicity, discussions will concentrate mainly on an NGIO or Infiniband network having several example nodes (e.g., computers, servers and I/O units) interconnected by corresponding links and switches, although the scope of the present invention is not limited thereto. A wide variety of implementations, arrangements and configurations of devices (e.g., host systems and I/O units), switches and links in all types of data networks may be possible.

According to an example embodiment or implementation of the invention, the various devices connected to the network may utilize channel adapters compatible with the NGIO specifications, Version 1.0, published by the NGIO forum on or about Jul. 20, 1999 or with the Infiniband specifications developed by the Infiniband Trade Association (www.infinibandta.org). The network consists of a channel-based switched fabric (e.g., collection of links, switches and/or switch elements connecting a number of host systems and I/O units), and the endpoint may be a host system including one or more host channel adapters (HCA), or a target system such as an I/O unit including one or more target channel adapters (TCAs). Both the host channel adapter (HCA) and the target channel adapter (TCA) may be broadly considered as fabric adapters provided to interface endpoints to the NGIO switched fabric, and may be implemented in compliance with the NGIO specification for enabling the endpoints (nodes) to communicate to each other over an NGIO channel(s).

Figure 1:
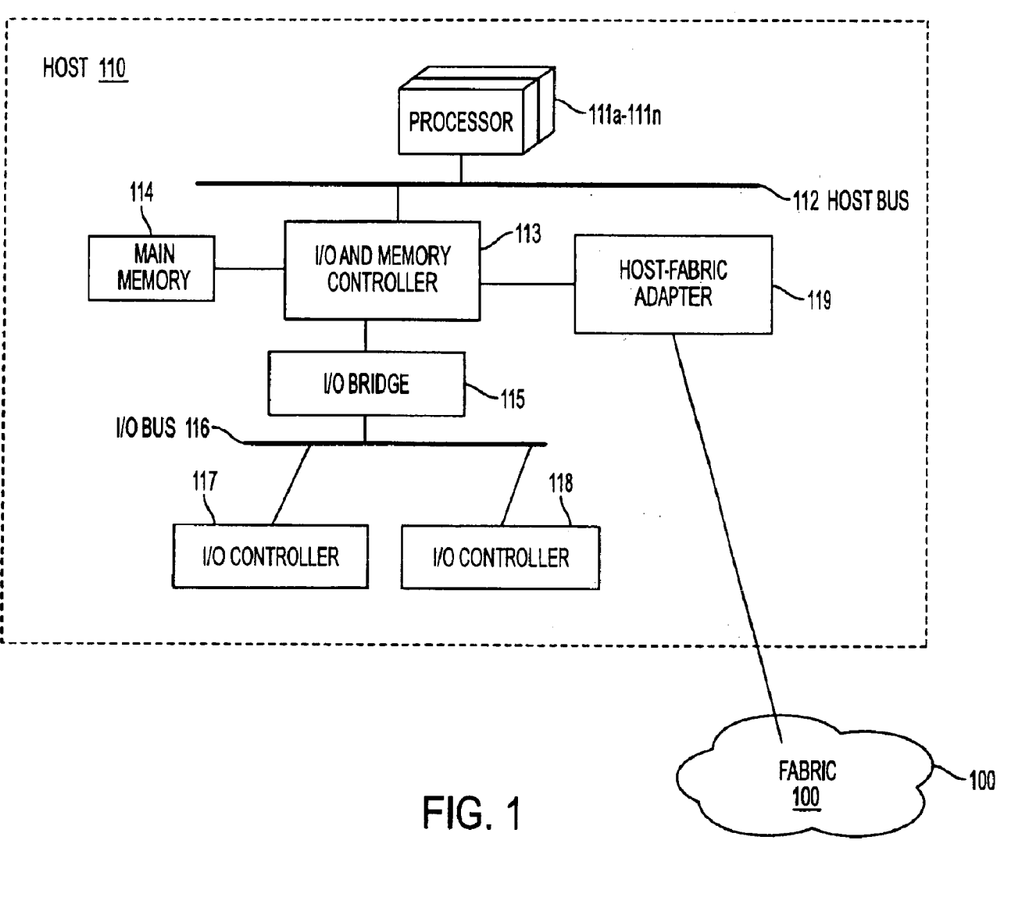
FIG. 1 is a generalized block diagram of a processing system showing one possible implementation of a host fabric adapter according to the invention in order to connect the processing system to a data communications network.

An example application of a fabric channel adapter in a host processing system connected to a data network is shown in FIG. 1. Host processing system 110 may be a multi-processor system, including one or more processors 111a–111n coupled to a host bus 112. Each of the multiple processors 111a–111n may operate on a single item (I/O operation), and all of the multiple processors 111a–111n may operate on multiple items (I/O operations) on a list at the same time. An I/O and memory controller interface 113 (or chipset) is connected to the host bus 112. A main memory 114 may be connected to the I/O and memory controller 113. An I/O bridge 115 operates to bridge or interface between the I/O and memory controller 113 and an I/O bus 116. Several I/O controllers may be attached to I/O bus 116, including I/O controllers 117 and 118. I/O controllers 117 and 118 (including any I/O devices connected thereto) may provide bus-based I/O resources.

Figure 2:
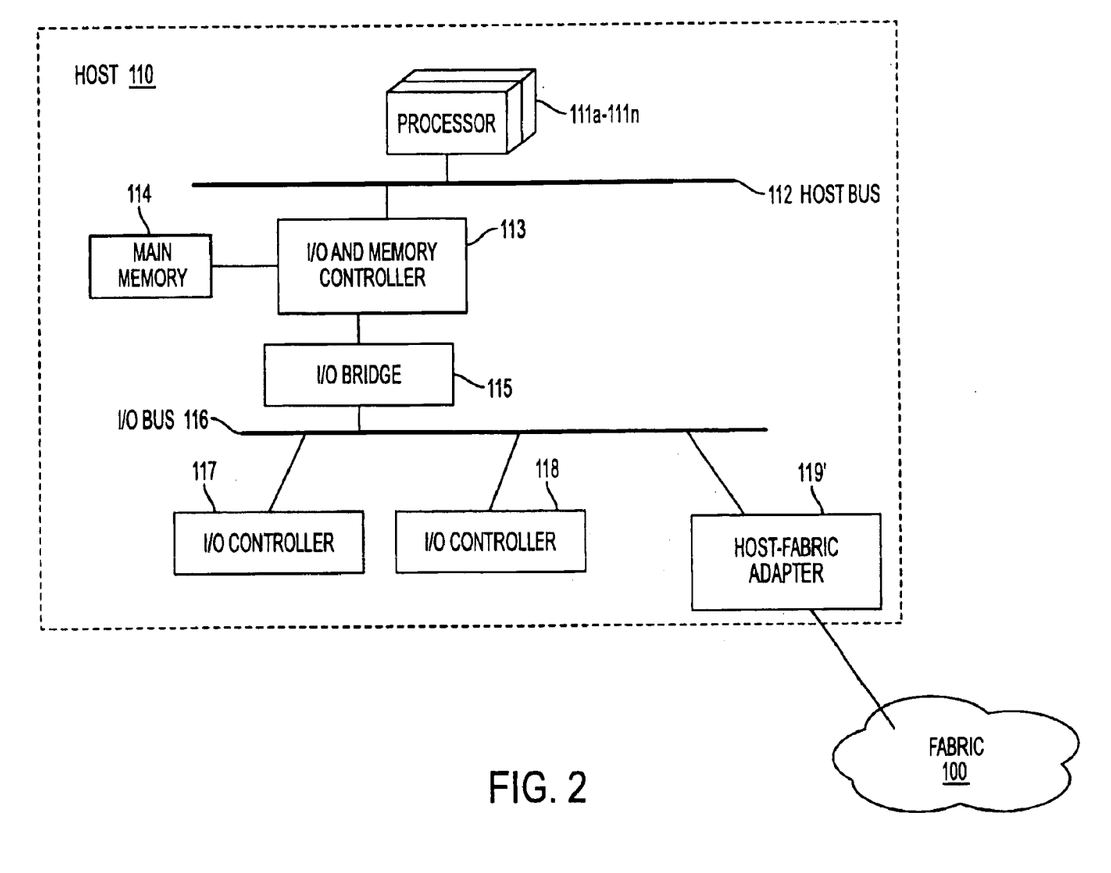
FIG. 2 is a generalized block diagram of a processing system showing a second possible implementation of a host fabric adapter according to the invention in order to connect the processing system to a data communications network.

As shown in FIG. 1, a channel adapter 119 is preferably connected between the I/O and memory controller 113 and the network switching fabric 100. In the event that the I/O and memory controller 113 in any given processing system cannot directly support channel adapter 119, then a channel adapter 119' can be connected to PCI bus via an expansion card as shown in FIG. 2. However, the connection of a channel adapter directly to the I/O and memory controller 113 as shown in FIG. 1 has the advantage of avoiding the afore-mentioned limitations of the I/O bus 116. In either instance, one or more fabric channel adapters may be provided to interface the host system 110 to the network switching fabric.

A software stack may be provided in channel adapter 119 or 119' to access the network switching fabric 100 and information about fabric configuration, fabric topology and connection information. The operating system software (OS) of the processing system 100 may include a fabric bus driver and a fabric adapter device-specific driver utilized to establish communication with a remote fabric-attached agent (e.g., I/O controller) of another processing system connected to the network, and perform functions common to most drivers, including, for example, host-fabric adapter initialization and configuration, channel configuration, channel abstraction, resource management, fabric management service and operations, send/receive I/O transaction messages, remote direct memory access (rDMA) transactions (e.g., read and write operations), queue management, memory registration, descriptor management, message flow control, and transient error handling and recovery. Such a software driver module may be written using high-level programming languages such as C, C++ and Visual Basic, and may be provided on a tangible medium, such as a memory device, magnetic disk (fixed, floppy, and removable), other magnetic media such as magnetic tapes; optical media such as CD-ROM disks, or via Internet download, which may be available for a network administrator to conveniently plug-in or download into existing operating system software. Such a software driver module may also be bundled with the existing operating system which may be activated by a particular device driver.

The example embodiments of the invention described in this application are implemented in a hardware device compliant with the Next Generation I/O (NGIO) or Infiniband architecture. The example embodiment and other embodiments of the invention can be implemented in conjunction with other types of switched fabric channel-based I/O architectures. The example NGIO and Infiniband embodiments use a similar model for input/output data transfer as is specified by the Virtual Interface (VI) architecture. While providing high reliability, the VI architecture does not perform other transport level functions, including flow control, buffer management and fragmentation and reassembly. The VI architecture has been developed as an improvement over TCP/IP communication protocols in certain network environments. The Transmission Control Protocol (TCP) is a sliding window flow control protocol that uses sequence numbers, acknowledgments, error detection, retransmission oflost packets, etc., where the underlying network environment is presumed to be inherently unreliable. However, the centralized in-kernel protocol processing in TCP/IP networks prohibits applications from realizing the potential raw hardware performance offered by underlying high-speed networks. In contrast, the Virtual Interface (VI) Architecture enables distributed applications to perform low overhead communication over high-bandwidth, low-latency networks interconnecting nodes within a distributed computer system. VI is described in detail in the Virtual Interface Architecture Specification, Version 1.0, Dec. 16, 1997, jointly authored by Intel Corporation, Microsoft Corporation, and Compaq Computer Corporation, and makes it possible to perform low overhead communication using off-the shelf SAN hardware.

A highly efficient interface may thus be beneficially used by various computer devices having NGIO hardware connected to a network fabric. However, the example embodiment and other embodiments of the invention may also be used with non-NGIO hardware. However, such an implementation is but one possible application of the example embodiment which may, of course, be applied in any device having a processor and indeed in any server architecture where an improvement in the speed of communications with a network is desired for whatever reason.

Figure 3:
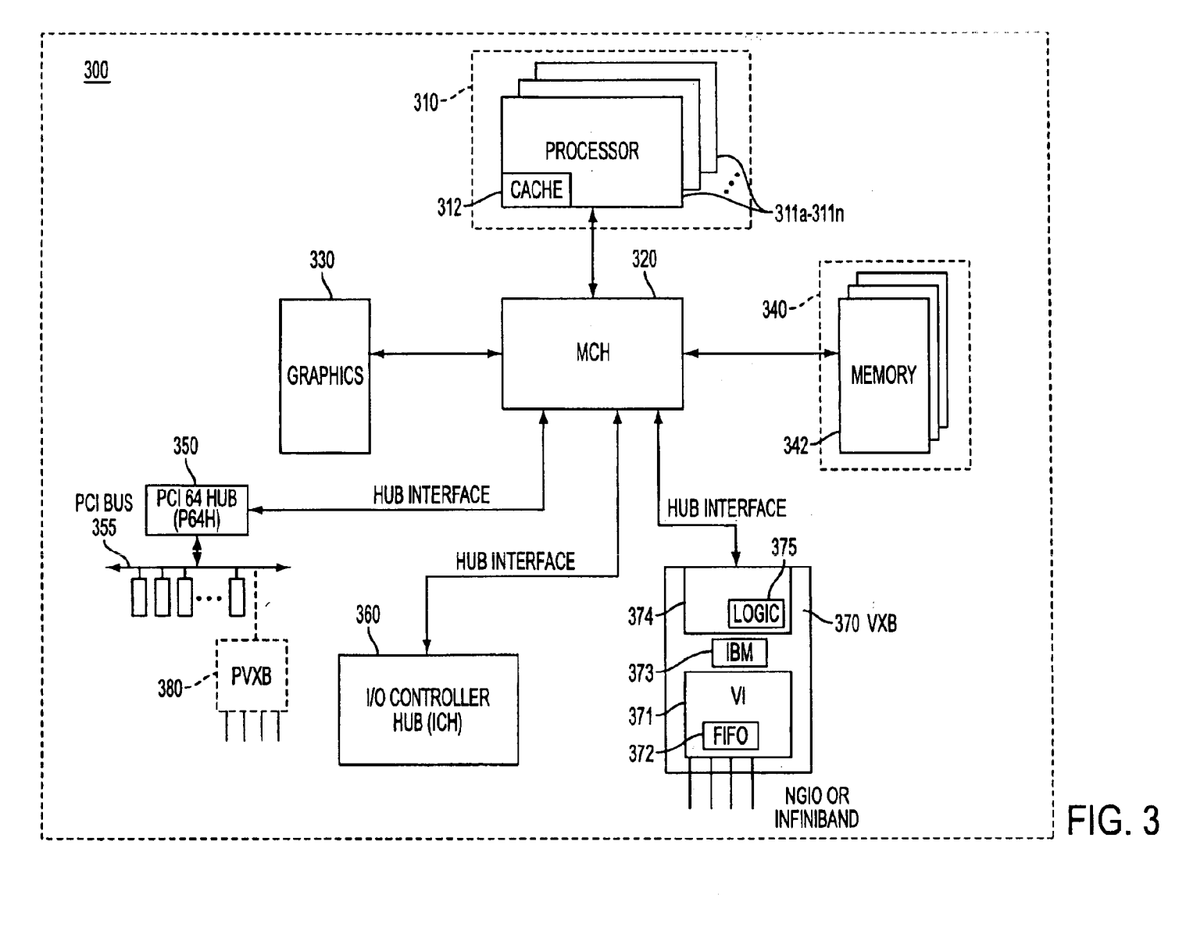
FIG. 3 shows a possible architecture of a host processing system having a virtual interface expansion bridge according to an example embodiment of the present invention.

Attention now is directed to FIG. 3, an example computer system platform having an example virtual interface expansion bridge (VXB) incorporated therein according to the principles of the present invention. As shown in FIG. 3, the computer system 300 may comprise a processor subsystem 310 (which may be comprised of a plurality of processors 311a–311n and at least one cache memory 312), a memory controller hub (MCH) 320 connected to the processor subsystem 310 (by a host interface or a front side bus), a graphics subsystem 330 (possibly including a AGP 4× graphics controller, a local memory and a display device such as a cathode ray tube, liquid crystal display, or flat panel display) connected to the memory controller hub 320 by a graphics bus (such as an AGP 2.0 bus), and a memory subsystem 340 storing information and instructions for use by the processor subsystem 310 and having at least one memory element 342 connected to MCH 320 by a memory bus. The memory subsystem 340 is preferably a dynamic random-access-memory (DRAM), but may be substituted for read-only-memory (ROM), video random-access-memory (VRAM) and the like.

A PCI 64-bit hub (P64H) bridge 350 may be connected to MCH 320 by a dedicated 16 bit hub interface, for example, and may operate as an interface between MCH 320 and peripheral PCI bus 355. PCI bus 355 may be a high performance 32 or 64 bit synchronous bus with automatic configurability and multiplexed address, control and data lines as described in the latest version of "*PCI Local Bus Specification, Revision* 2.2" set forth by the PCI Special Interest Group (SIG) on Dec. 18, 1998 for add-on arrangements (e.g., expansion cards) with new video, networking, or disk memory storage capabilities. For example, PCI bus 355 operate at 64-bits and 66 MHz or at 32-bits and 33 MHz. Of course, other types of bus architecture and corresponding bridges, such as Industry Standard Architecture (ISA) and Expanded Industry Standard Architecture (EISA) buses may also be utilized.

There may also be a highly integrated multifunctional I/O controller hub (ICH) bridge 360 connected to MCH 320 by a dedicated 16 bit hub interface and to a number of I/O devices, including possibly a Peripheral Component Interconnect (PCI) bus. A firmware hub and various I/O devices (not shown) may be connected to ICH 360, including, for example, Super I/O providing a low pin count (LPC) bus interface with various I/O devices, including a keyboard controller for controlling operations of an alphanumeric keyboard, a cursor control device such as a mouse, track ball, touch pad, joystick, etc., a mass storage device such as magnetic tapes, hard disk drives (HDD), and floppy disk drives (FDD), universal serial bus (USB) ports, links for audio and telephony codec(s), and parallel ports to printers, scanners, and display devices.

The MCH 320, P64H 350 and ICH 360 may be implemented as a single chipset. Also, the computer system 300 may be configured differently or employ some different components than those shown in FIG. 3.

A virtual interface expansion bridge (VXB) 370 according to an example embodiment of the invention is also connected to MCH 320 over a dedicated hub interface. A VXB according to the invention may transmit and receive data from either a single network serial link or from a plurality of separate network serial links. VXB 370 in the example embodiment of FIG. 3 is chosen to have four ports configured to receive data from respective NGIO or Infiniband serial communication links. The core of VXB 370 is a virtual interface (VI) architecture 371 having at least one 8-byte wide, byte oriented receive first-in-first-out (FIFO) buffer 372 which holds the data from the network link.

The data from the network serial links are a byte wide and are passed directly into the FIFO buffer(s) 372 of the Virtual Interface 371. The header information is removed from the data packets and the payload data is then passed in byte oriented transactions from VI 371 to a Hub interface (or other host interface) 374 through an in-bound multiplexer (IBM) 373. The transactions include: 1) the payload data; 2) the byte length of the data; 3) a destination address for the data; and 4) the alignment of the data (which byte lane has the first valid byte) in the FIFO buffer(s) 372.

One aspect of the present invention is that logic in VXB 370 partitions transactions transferring the payload data received off the network in byte granularity and converted into naturally aligned quad-words (64 bits) suitable for transfer over the dedicated hub interface. The converted data may be either control or payload. In general, the payload data is destined to main memory. Hub interface 374 of VXB 370 aligns the byte oriented payload data from the network link into naturally aligned quad-words and optimally partitions the transactions for transmission to MCH 320. Specifically, the data in receive FIFO buffer(s) 372 is converted into naturally aligned quad-words and the transactions are partitioned according to the byte lane of first valid payload data, the total number of bytes in the payload and the destination memory address in which to put the first valid payload byte.

Figure 4A:
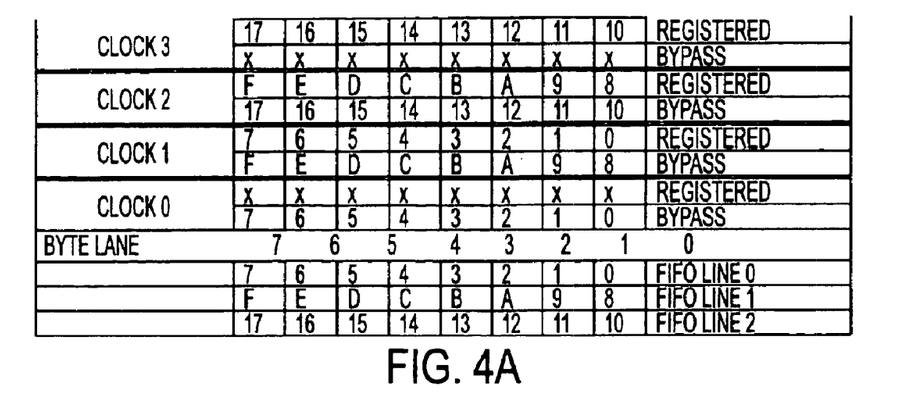
FIGS. 4A–4C illustrate the transfer of data from the virtual interface expansion bridge to the host processor of the host processing system in the example embodiment shown in FIG. 3.
Figure 4B:
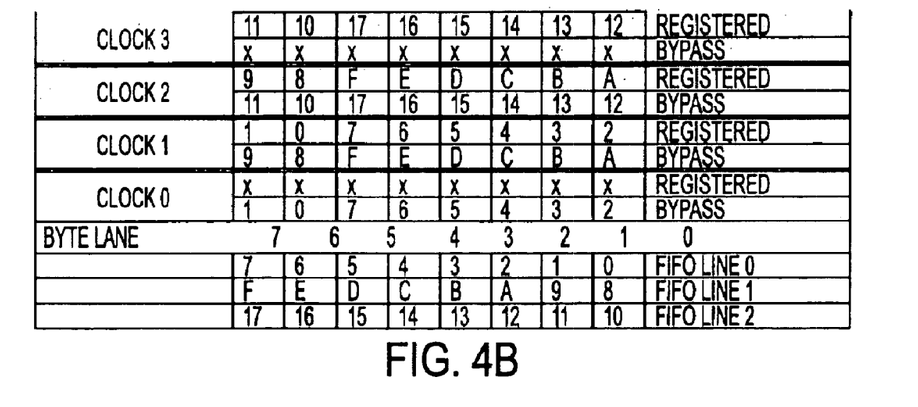
Figure 4C:
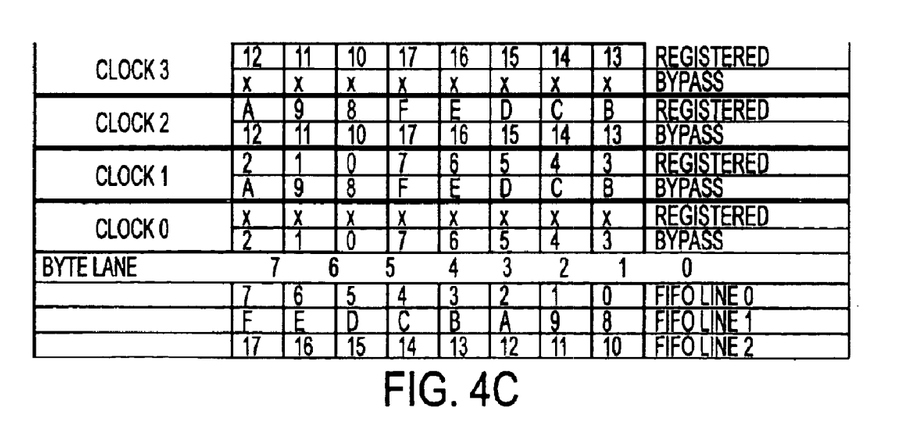
Figure 5A:
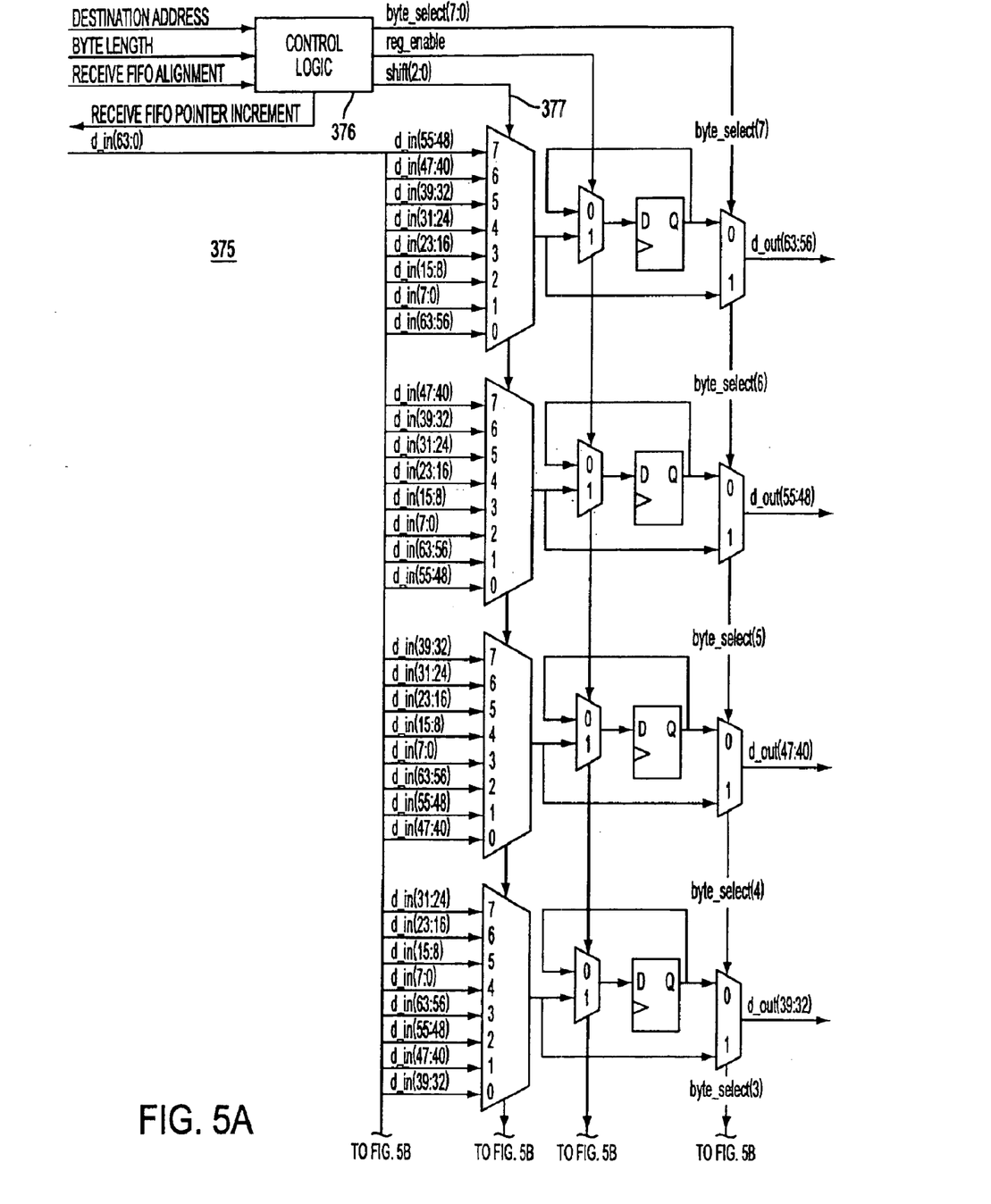
FIGS. 5A and 5B represent a block diagram of the byte steering logic in the virtual interface expansion bridge according to the example embodiment of the present invention shown in FIG. 3.
Figure 5B:
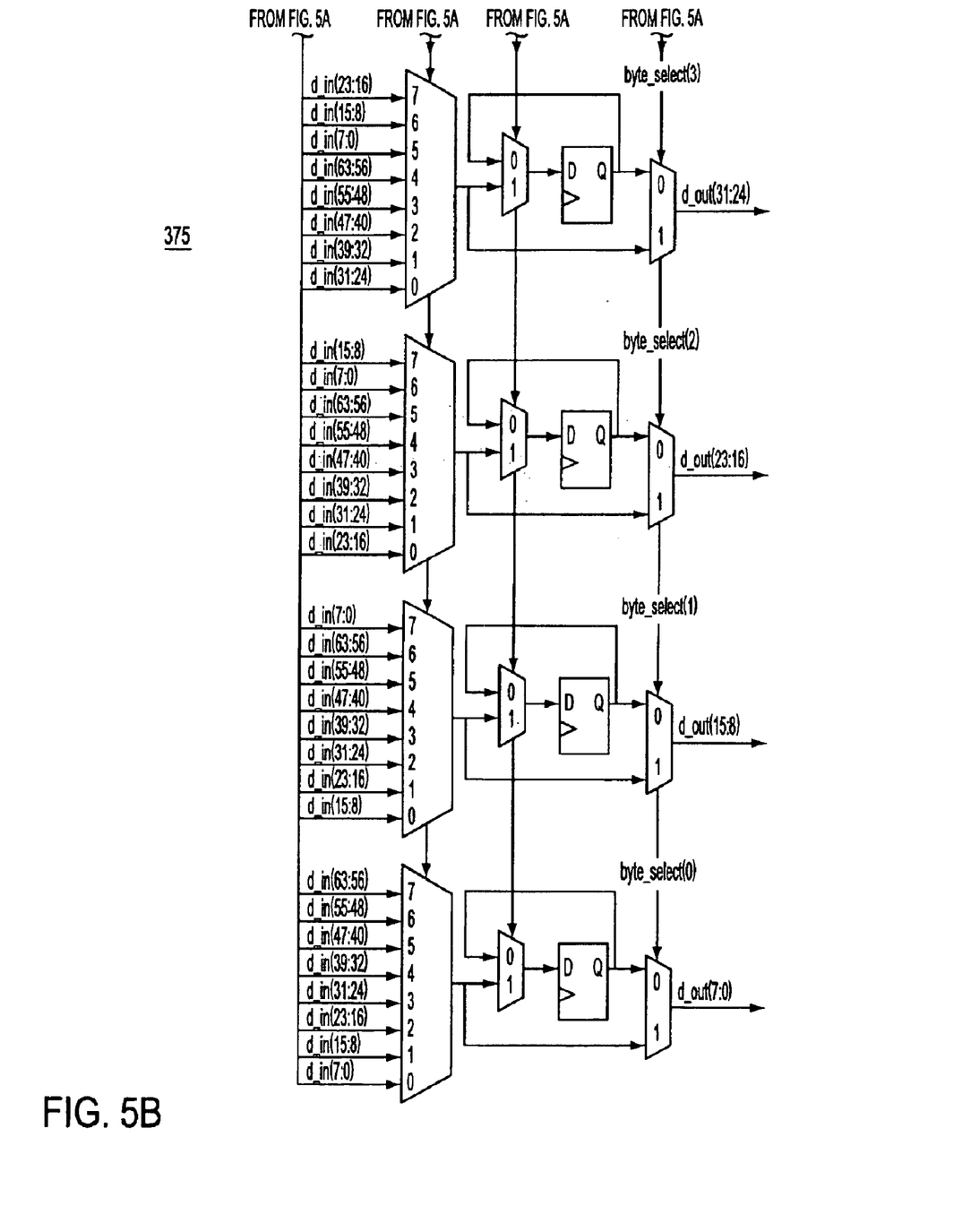

A byte steering logic and control circuit 375 in hub interface 374 directly controls the receive FIFO read pointer and generates naturally aligned quad-word data outputted to MCH 320. Using the destination memory address and the first valid byte lane, the control logic 376 in byte steering logic and control circuitry 375 outputs a shift signal 377 (shown in FIG. 5) which shifts the data path of each of the bits to put the first valid data byte in its naturally aligned location as shown in FIG. 4. If all the data for the quad-word is available in the given line of the receive FIFO 372, the circuitry aligns the quad-word for transfer to MCH 320. Any extra data from the given line of the receive FIFO is latched and held to be merged with the next line of the receive FIFO. If all the valid data for the quad-word is not available in the given line of the receive FIFO, the circuitry latches the valid data from the current line and then outputs a signal incrementing the pointer of receive FIFO 372 to the next line. The latched data is then merged with the new line of data to form the naturally aligned quad-word for transfer to the MCH 320.

VXB 370 also generates byte enables for partially valid quad-words and then partitions data transaction based on the byte enables. The examples in FIGS. 4A–4C illustrate how data is taken from receive FIFO buffer(s) 372 for transfer to MCH 320. The bottom three rows of each figure represent data that is in receive FIFO buffer(s) 372. The upper eight tows represent data as it passes through the byte steering logic and control circuit 375 logically illustrated in FIGS. 5A and 5B. The low line of data for each clock is the data that is passed through and the upper line of data for each clock represents the data that is in the registers of circuit 375. The shaded data in each figure is the data prepared for transfer to MCH 320. In all cases, MCH 320 receives a naturally aligned quad-word.

In the no-shift example illustrated in FIG. 4A, the destination address is 000 b, the byte length is 1100 b, and the receive FIFO alignment is 000 b. In this case, there is no shifting since byte lane 0 of the receive FIFO is aligned with byte lane 0 of address space. One clock is used to register the entire line of data. Data is registered in this case since it can all be done during the same clock cycle. In this example, no bytes are enabled in the first clock, and all bytes are enabled in clocks 1 through 3.

In the example illustrated in FIG. 4B, the destination address is 000, the byte length is 1010 b and the receive FIFO alignment is 010 b. In this case, data is shifted to the right two byte lanes. In this example, no bytes are enabled in the first clock, all bytes are enabled in clocks 1 and 2, and only bytes 0–5 are enabled in clock 3.

In the example illustrated in FIG. 4C, the destination address is 101 b, the byte length is 1000 b, and the receive FIFO alignment is 000 b. In this case, data is shifted to the left five byte lanes. Also, the first data is taken in clock 0 rather than clock 1 like the previous examples. This is required due to the left shift through the steering logic. In this example, bytes 5–7 are enabled in clock 1, all bytes are enabled in clocks 1 and 2, and only bytes 0–4 are enabled in clock 3.

As illustrated by the example embodiment described above with reference to FIGS. 3–5B, one advantage of the invention is that it eliminates the need for a naturally aligned FIFO buffer to service a host interface such as a memory controller hub. It prepares data from the byte oriented buffer as if the data is comming directly from a naturally aligned quad-word FIFO. This is very useful for interfaces, such as a hub interface which requires naturally aligned data. Other advantages obtained by circuit 375 include minimum latency for the conversion and scalability to other alignments and granularities.

The transaction partitioning employed in the example embodiments of the invention is useful for host interfaces that operate with or require naturally aligned data, such as a hub interface, and which pump data multiple times in each clock cycle of the bus. Specifically, the virtual interface expansion bridge (VXB) such as VXB 370 partitions transactions so that they can be transmitted on the host interface with a granularity determined by the bus width and the number of times data is pumped in each clock cycle. For example, for a quad pumped 16 bit wide host bus, the example embodiment partitions transactions for a bus requiring naturally aligned quad-words of 64 bits (8 bytes). The data transaction can be simplified and completed faster since MCH 320 knows that the lower 3 bits of the address will always be 0. Furthermore, the first byte enables will always be associated with a low order double word (dword) and the last byte enables will always be associated with a high order dword. There may also be a limit to the number of naturally aligned quad-words which may be transferred for a given transaction. Of course, notwithstanding the example embodiments, the invention can be used with buses having different bus speeds, and octal or dual pumping instead of quad pumping. It is preferred though that the bus is a point-to-point bus between two integrated circuit chips so that it does not have the disadvantages mentioned above with respect to PCI buses and the like in which several devices are connected to, and must compete for access to, the bus. In addition, with a point-to-point bus, the bus bandwidth can be optimized to be consistent with the processing speed of the integrated circuits and the pin count can be minimized to save space.

The hub interface in the example embodiment utilizes split transactions in which the information passed from VXB 370 to MCH 320 during the first common clock cycle is encoded command data identifying the transaction as either a write transfer, a write with acknowledgment request or a read request, the amount of data in the transaction and the destination address. For a write transfer or a write with an acknowledgment request, the data is transferred in subsequent clock cycles. In a read request, MCH 320 responds later with a transaction ID identifying the read request and the requested data. Since the data in a read transaction comes from MCH 320, the transaction is only partitioned if the length of read data exceeds the maximum data size of a single transactions. In such a case, the requested data is partitioned into a maximum of two transactions. No response is provided for write transactions unless an acknowledgment is requested.

Figure 6:
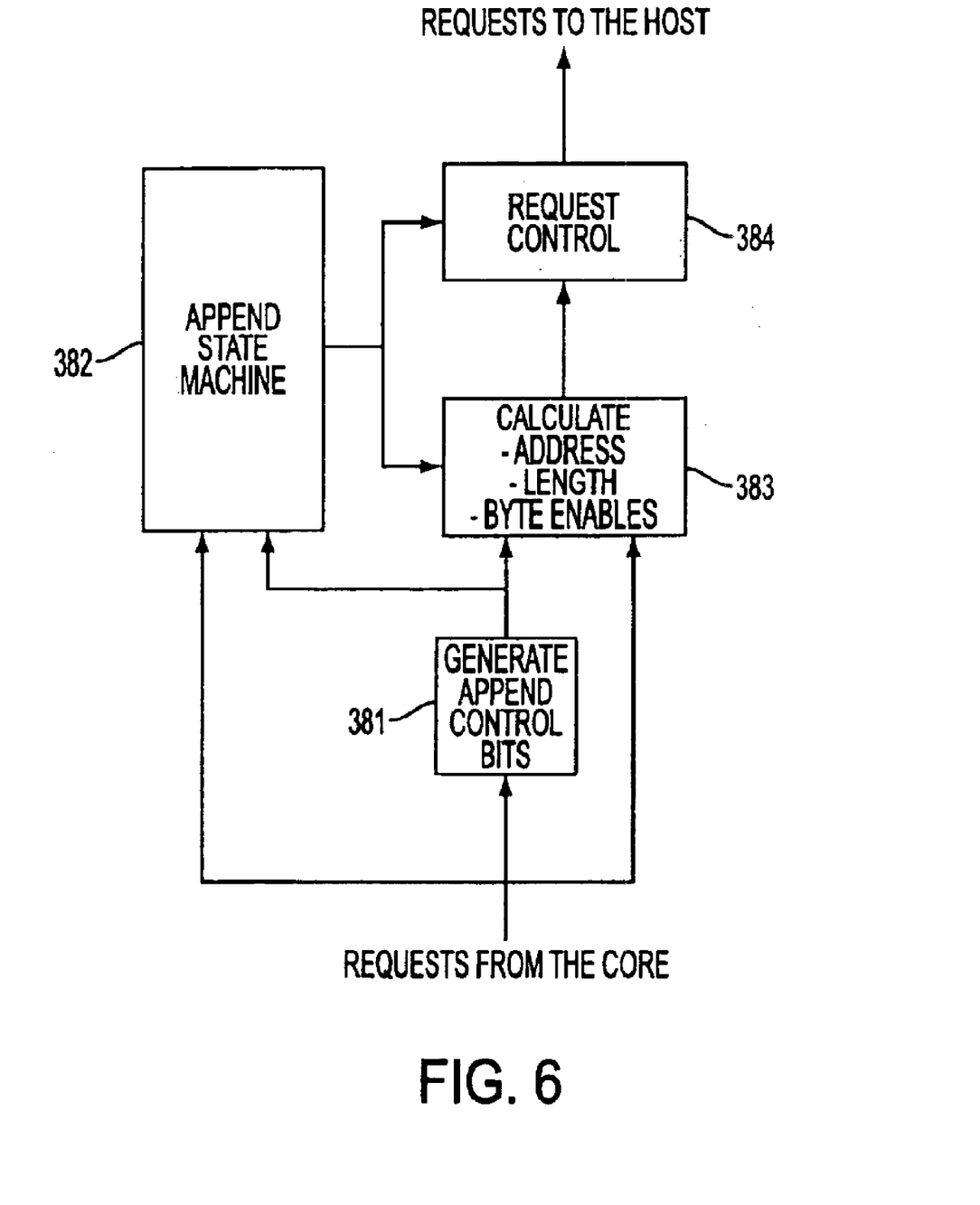
FIG. 6 is a block diagram of the transaction partitioning logic in an example embodiment of the invention.

The optimal transaction partitioning is provided by the logic block diagram illustrated in FIG. 6. It takes advantage of original transaction size, alignment, and byte enables to minimize the amount of transaction partitioning. When a transaction is received from steering logic and control circuit 375, the transaction partitioning logic determines how the transaction must be partitioned for the bus. The partitioning information is passed to append state machine 382 and to the address, length, and byte enable calculator 383 in the form of append control bits generated at logic 381. Append state machine 382 tracks the progress of transactions passed to the MCH 320 and informs the rest of the logic. Request control logic 384 handshakes with the control logic of MCH 320 to pass each transaction that is generated.

Figure 8:
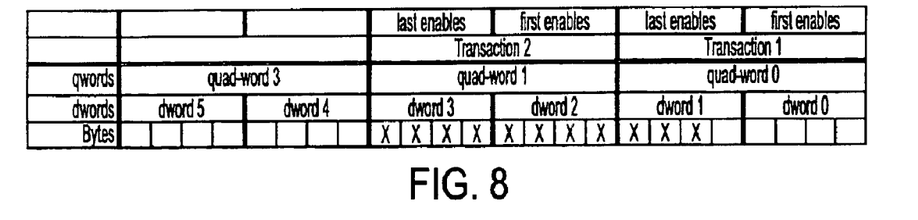
FIG. 8 illustrates a data transaction in an example embodiment of the invention in which the data starts in a high order dword.
Figure 9:
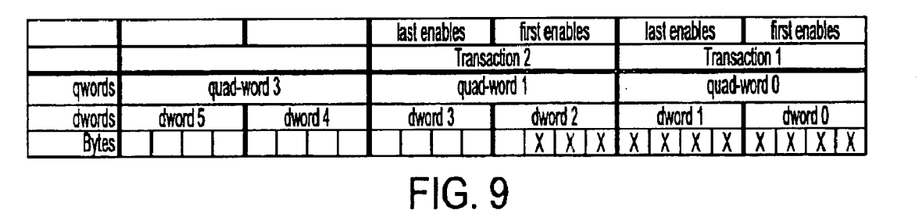
FIG. 9 illustrates a data transaction in an example embodiment of the invention in which the data ends in a low order dword.
Figure 10:
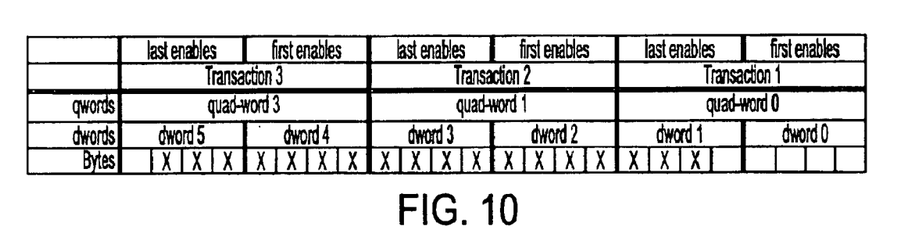
FIG. 10 illustrates a data transaction in an example embodiment of the invention in which the data starts in a high order dword and ends in a low order dword.

A number of different states are utilized in append state machine 382. "Pre-appended transactions" are those transactions which are required for transferring the first naturally aligned quad-word for the purposes of aligning the byte enables. Transaction 1 in FIGS. 8 and 10 are examples of pre-appending. "Post-appended transactions" are those transactions which are required for transferring the last naturally aligned quad word for the purposes of aligning the byte enables. Transaction 2 in FIG. 9 and transaction 3 in FIG. 10 are examples of post-appending. "Body transactions" are those transactions that are neither pre-appended or post-appended. Examples of body transactions are transaction 2 of FIG. 8, transaction 1 of FIG. 9, transaction 2 of FIG. 10 and transaction 1 of FIG. 11.

Figure 7:
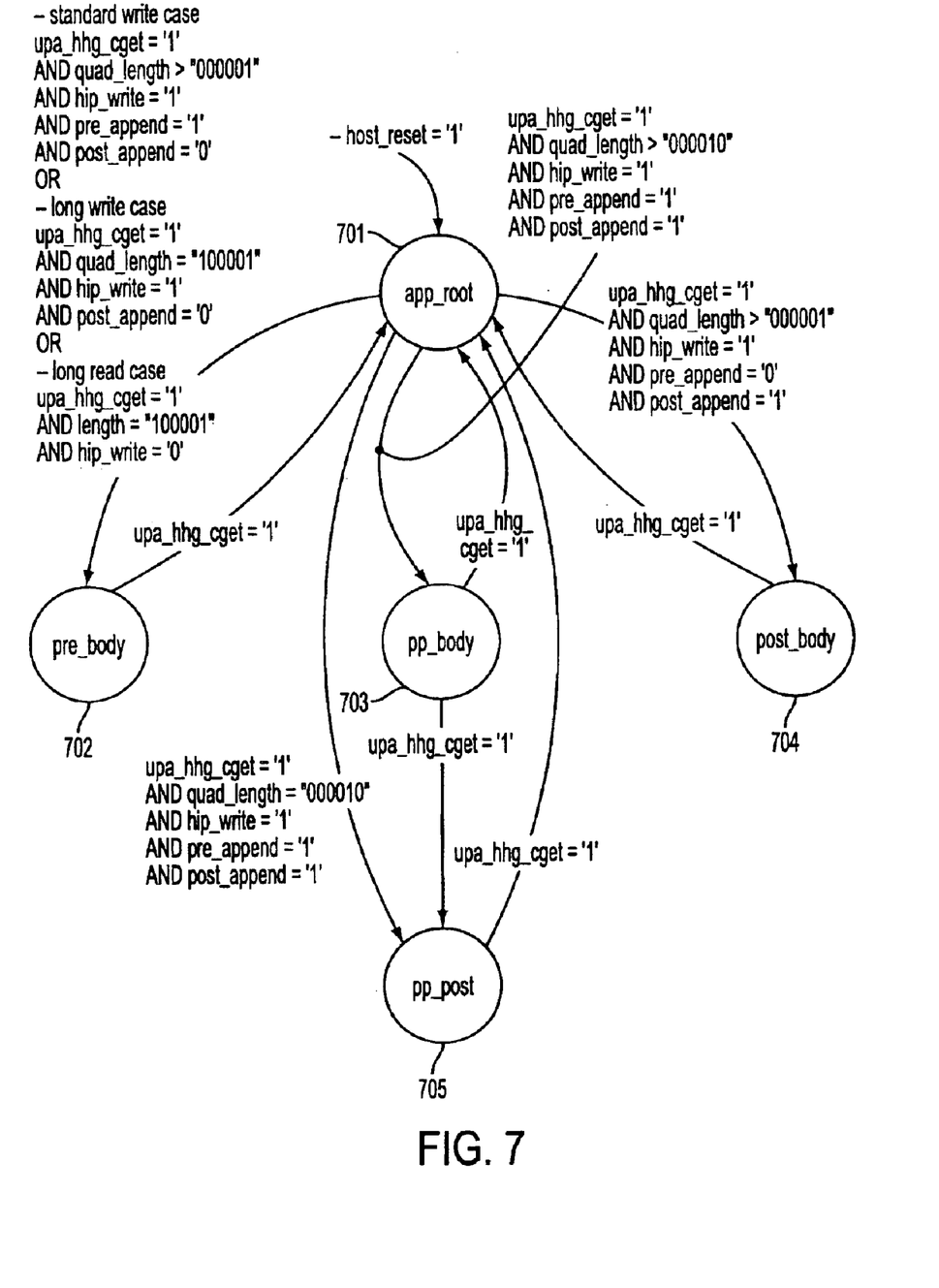
FIG. 7 is an illustration of the append state machine used in the transaction partitioning logic of FIG. 6.

An example embodiment of append state machine 382 is illustrated in FIG. 7. The initial state is "app_root" 701. The path to "pre_body" state 702 is taken only if there needs to be a pre-append and no post-append. The path from initial state 701 to "post_post" state 704 is taken if there needs to be only a post-append. The path from the initial state 701 to the "pp_body" state 703 and from there to the "pp_post" state 705 is taken only if there needs to be both a pre-append and a post-append.

For those transactions in which the data starts in the upper three byte lanes, the transaction is partitioned into at least two separate transactions. FIG. 8 shows the partitioning for such a transaction. For those transactions in which the data ends in the lower three byte lanes, the transaction is partitioned into at least two separate transactions. FIG. 9 shows how this partitioning is done. In those transactions where the data starts in the upper three dwords and ends in the lower three dwords, the transaction is partitioned into three separate transactions. FIG. 10 illustrates this partitioning. In each one of FIGS. 8–10, all dword and quad-word boundaries are naturally aligned and the "X"'s indicate valid byte enables provided by VXB 370.

Figure 11:
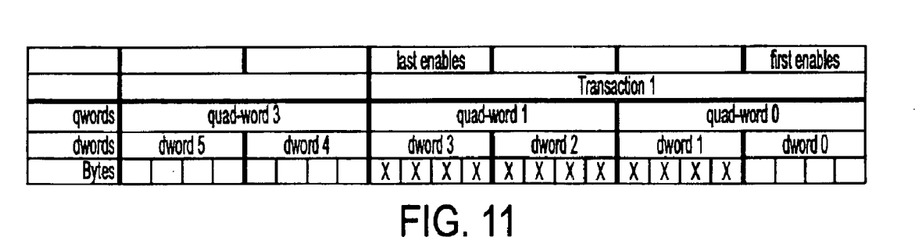
FIG. 11 illustrates a special case non-pre-appending data transaction in an example embodiment of the invention.

The example embodiment of the invention also takes full advantage of short lengths and byte enables to minimize the amount of partitioning. If completely de-asserting a dword of byte enables eliminates the need for partitioning, then it is done. A special case is illustrated in FIG. 11. The request starts on a high order dword, but all the bytes in the dword are enabled. In this instance, the first byte enables are shifted to the lower dword and de-asserted and only one transaction is generated as shown in FIG. 11. This special case is called non-pre-appending. Similar optimization is done for transactions ending on a low order dwords and is called non-post-appending. It is possible to have transaction with both non-pre-appending and non-post-appending.

The invention is not limited to a host processing system having an architecture as illustrated in FIG. 3. Indeed, an advantage of the invention is that it may be useful and widely adaptable to many data bridges. For example, although it is preferred that a VXB connect directly to a memory controller hub as shown in FIG. 3, it may also be implemented as a PCI Virtual Interface Expansion Bridge (PVXB) connected to a PCI bus as exemplified by PVXB 380 in FIG. 3 or to a PCI-X bus (not shown) where interface 375 is replaced with an interface appropriate for the PCI or PCI-X bus. For example, the data transactions can be partitioned as described above so that it is appropriate for data transfers over a PCI or PCI-X bus. In particular, a single silicon integrated circuit chip may be produced with different respective interfaces contained in the silicon so that manufactured chips having the same silicon die can be implemented for use with any interface by changing the die and pin connections on the chip package.

Other features of the invention may be apparent to those skilled in the art from the detailed description of the example embodiments and claims when read in connection with the accompanying drawings. While the foregoing and following written and illustrated disclosure focuses on disclosing example embodiments of the invention, it should be understood that the same is by way of illustration and example only, is not to be taken by way of limitation and may be modified in learned practice of the invention. While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

What is claimed is:

1. A network interface comprising:
   a host interface of a processing system;
   a first-in-first-out (FIFO) buffer to receive and store data from a serial link of a network;
   a byte steering logic circuit to align data in said FIFO buffer with the host interface; and
   a partitioning logic circuit to partition transactions providing said data to said host interface.

2. A network interface according to claim 1, said byte steering logic circuit to receive transaction data including payload data, length of payload data, destination address and alignment of the data.

3. A network interface according to claim 1, said host interface to require naturally aligned data and said byte steering logic circuit to include control logic to output a shift signal based on the byte length and alignment data to put the first valid byte in a naturally aligned location.

4. A network interface according to claim 1, said partitioning logic circuit to generate append control bits to partition and either pre-append or post-append said data transactions.

5. A network interface according to claim 1, said partitioning logic circuit comprising an append state machine to track progress of partitioned data transactions.

6. A network interface according to claim 1, said byte steering logic circuit to shift the data in the FIFO buffer until the first byte of the data in the FIFO buffer is positioned in a first byte position of the FIFO buffer corresponding to a first byte position of a destination address.

7. An apparatus comprising:
   a steering logic circuit to convert data transactions into quad-words and align the quad-words with a host interface; and
   a partitioning circuit to optimally partition the data transactions for transfer to the host interface.

8. An apparatus according to claim 7, said steering logic circuit to:
   receive the data transactions, each transaction including data, a byte length of the data, a destination address of the data, and an alignment of the data; and
   output a shift signal based on the byte length and the alignment to put the first valid byte of each data transaction into a quad-word in a naturally aligned location.

9. An apparatus according to claim 7, said partitioning circuit to:
   determine, from byte enable signals, whether the bytes of each data transaction start in a high order dword or end in a low order dword of a quad-word;
   pre-append the data transactions if the bytes of the data transactions start in the upper three dwords of the quad-words; and
   post-append the data transactions if the bytes of the data transactions end in the lower three dwords of the quad-words.

10. A data partitioner, comprising:
    means for receiving unaligned data from a network;
    means for aligning the data with a host interface; and
    means for partitioning the aligned data into data transactions to be transferred to the host interface.

11. A data partitioner according to claim 10, the means for aligning comprising:
    means for shifting the unaligned data in the means for receiving in order to align the unaligned data with the host interface based on a byte length of the unaligned data and a position of the unaligned data in the means for receiving.

12. A data partitioner according to claim 10, the means for partitioning comprising:
    means for pre-appending the aligned data based on the start position of the aligned data in the means for receiving in order to generate the data transactions.

13. A data partitioner according to claim 10, the means for partitioning comprising:

means for post-appending the aligned data based on the end position of the aligned data in the means for receiving in order to generate the data transactions.

14. A system comprising:

a network interface including
- a partitioning logic circuit
  - to determine whether bytes of data to be transferred start in a high order dword or end in a low order dword of a quad-word, and
  - to partition the data into transactions based on the determination; and an input/output device in communication with the network interface to receive the partitioned transactions.

15. A system according to claim 14, wherein the input/output device is a cursor control device.

16. A system according to claim 14, wherein the input/output device is a mass storage device.

17. A system according to claim 14, further comprising:

a bus coupled to the network interface and the input/output device to transmit the partitioned transactions from the network interface to the input/output device.

* * * * *